(12) United States Patent
Hollub, IV

(10) Patent No.: US 9,278,703 B1
(45) Date of Patent: Mar. 8, 2016

(54) APPARATUS HAVING A HAND TRUCK CONFIGURATION AND A TRIPOD CONFIGURATION

(71) Applicant: Edmund E. Hollub, IV, Friendswood, TX (US)

(72) Inventor: Edmund E. Hollub, IV, Friendswood, TX (US)

( * ) Notice: Subject to any disclaimer, the term of this patent is extended or adjusted under 35 U.S.C. 154(b) by 0 days.

(21) Appl. No.: 14/535,207

(22) Filed: Nov. 6, 2014

(51) Int. Cl.
*B62B 1/12* (2006.01)
*F16M 11/20* (2006.01)
*B25H 1/04* (2006.01)

(52) U.S. Cl.
CPC .. *B62B 1/12* (2013.01); *B25H 1/04* (2013.01); *F16M 11/2092* (2013.01)

(58) Field of Classification Search
CPC ............ B62B 1/008; B62B 1/04; B62B 1/12; B62B 1/20; B62B 3/02; B62B 2205/26
See application file for complete search history.

(56) References Cited

U.S. PATENT DOCUMENTS

| | | | |
|---|---|---|---|
| 3,954,155 A * | 5/1976 | Guidara | E06C 1/20 182/20 |
| 4,106,590 A | 8/1978 | Tarran | |
| 4,565,382 A * | 1/1986 | Sherman | A47B 3/10 108/18 |
| 4,921,270 A * | 5/1990 | Schoberg | B62B 1/002 280/47.27 |
| 5,257,892 A | 11/1993 | Branch | |
| 5,718,440 A | 2/1998 | Roxbury | |
| 5,931,483 A * | 8/1999 | Haynes | B62B 1/12 280/47.19 |
| 6,471,220 B1 * | 10/2002 | Babb | B25H 1/04 280/30 |
| 7,090,210 B2 * | 8/2006 | Lawrence | B25H 1/04 269/139 |
| 7,648,155 B1 * | 1/2010 | Wise | B25H 1/04 280/35 |
| 7,726,669 B2 | 6/2010 | Alexander | |
| 8,127,694 B2 * | 3/2012 | Low | A47B 23/04 108/115 |
| 8,517,413 B2 * | 8/2013 | Chen | B25H 1/04 248/370 |
| 2003/0173753 A1 * | 9/2003 | Pong | B62B 1/12 280/47.27 |
| 2012/0153585 A1 * | 6/2012 | Ryan | B62B 1/002 280/47.18 |

* cited by examiner

*Primary Examiner* — Katy M Ebner
*Assistant Examiner* — Emma K Frick
(74) *Attorney, Agent, or Firm* — Andrew W. Chu; Craft Chu PLLC

(57) ABSTRACT

The apparatus transforms between a hand truck configuration and a tripod configuration. The apparatus includes a base frame, wheel axles, a base plate, a plurality of handle rods, and a center rod. The base frame is formed by lateral side supports, a top support member, upper and lower axle support bars, and a middle support member. The middle support member has a receptacle engaging a tool attachment. The base plate is made integral with the base frame, and the base frame extends orthogonally from a top planar surface of the base plate. The handle rods and center rod also extend orthogonally from the top planar surface in the hand truck configuration with the handle rods fixed to the top support member. Handle rods and center rod pivot at angles from the top planar surface in the tripod configuration. The apparatus transforms and inverts between configurations.

20 Claims, 3 Drawing Sheets

APPARATUS HAVING A HAND TRUCK CONFIGURATION AND A TRIPOD CONFIGURATION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to hand trucks. In particular, the present invention relates to a convertible multi-function hand truck. Even more particularly, the present invention relates to an apparatus convertible back and forth between a hand truck configuration and a heavy duty tripod configuration.

2. Description of Related Art Including Information Disclosed Under 37 CFR 1.97 and 37 CFR 1.98.

A hand truck is a familiar transportation apparatus used to move equipment. A hand truck may also be known as a "dolly", "sack truck" or "trolley". The hand truck is generally an L-shaped cart with handles on a vertical portion, wheels at the base, and a ledge on a horizontal portion. The load to be carried is placed on the ledge and rests against the vertical portion. The hand truck pivots on the wheels, so that the load is supported by the ledge and the vertical portion. The load can now be moved by the wheels of the hand truck, and the handles allow manual control of the direction and speed of movement. The hand truck is a basic lever with the load tilted over the pivot of the wheels.

Hand trucks or dollies are normally used to move heavy equipment that is difficult to carry by hand or even impossible to carry by individuals. In the plumbing and electrical repair industry, a hand truck is used to transport generators, heavy tool boxes, and heavy duty tools. When transporting heavy equipment, such as pipe benders and vices, the hand truck must also be transported. Each piece of equipment includes a stand or tripod, which supports the actual tool. A saw table has a stand to set on the ground. A vice requires a heavy duty tripod to anchor the vice in place. A pipe bending head also requires a strong stand to stabilize on the ground, when a pipe is being bent. Once the equipment is loaded onto a truck or other service vehicle, the hand truck must also be stowed on the truck, so that the equipment can be unloaded at the work site.

Hand trucks are fabricated from various materials, such as tubular steel, tubular aluminum, and even some plastics. Hand trucks can be light weight for certain types of equipment and supply transportation. Some hand trucks can be heavy for other types of equipment. There can be manipulation of features of the hand truck for particular uses.

Specialized hand trucks are known in the prior art.

U.S. Pat. No. 6,471,220, issued to Babb on Oct. 29, 2002, describes a cart and stand for supporting and transporting a metal working apparatus, such as a threading machine. The threading machine is heavy, and the cart configuration makes the threading machine mobile. The tripod configuration supports and stabilizes the threading machine. The apparatus is inverted for the different configuration.

U.S. Pat. No. 7,726,669, issued to Alexander on Jun. 1, 2010, describes an apparatus for a collapsible table and dolly. The transforming dolly is shown to form a general work surface for various tools. The apparatus is comprised of a vertical support, which acts as a handle during transport; a pair of wheels; a table mounted to one or more arms, which may be collapsed parallel to the vertical support during transport and extended when in use; a further pair of support legs hingedly mounted to the bottom of the table at the opposite end from the vertical support; and a wheel base.

U.S. Pat. No. 5,931,483, issued to Haynes on Aug. 3, 1999, describes a foldable bowling caddy. There is a foldable bowling caddy comprised of two legs, a series of flat racks, two wheels, and a third leg pivotally mounted as to form a tripod. When the device is extended for use, the racks are flat to accept bowling balls in a step-wise fashion, and the device rests on three legs in a tripod position.

U.S. Pat. No. 5,257,892, issued to Branch on Nov. 2, 1993, describes a multi-purpose transporting device. The device is comprised of a hand truck suitable for both horizontal cart and vertical dolly use. The transformation happens only by flipping orientation of the hand truck. On one side, the device is a hand truck. On the other side, the device is a tripod with an inverted platform.

Other prior art references disclose other variation of hand trucks and tripods for heavy tools. U.S. Pat. No. 5,718,440, issued to Roxbury on Feb. 17, 1998, describes a pipe vice transportation dolly mounted on a tripod. U.S. Pat. No. 7,648,155, issued to Wise on Jan. 19, 2010, describes a universal mobile saw stand. U.S. Pat. No. 4,565,382, issued to Sherman on Jan. 21, 1986, describes a combined portable table and hand truck. U.S. Pat. No. 4,106,590, issued to Terran on Aug. 15, 1978, describes a combined hand truck and ladder.

It is an object of the present invention to provide an embodiment of an apparatus with a hand truck configuration and a tripod configuration.

It is another object of the present invention to provide an embodiment of an apparatus convertible between a hand truck configuration and a tripod configuration.

It is still another object of the present invention to provide an embodiment of a hand truck transforming into a tripod.

It is an object of the present invention to provide an embodiment of an apparatus with dual hand truck and stand functions.

It is another object of the present invention to provide an embodiment of an apparatus with dual hand truck and stand functions, dependent upon configuration of the apparatus.

It is an object of the present invention to provide an embodiment of an apparatus with a hand truck configuration and a tripod configuration, which supports multiple heavy duty tools.

It is another object of the present invention to provide an embodiment of an apparatus with a hand truck configuration and a tripod configuration with a universal attachment for heavy duty tools.

It is another object of the present invention to provide an embodiment of an apparatus with a hand truck configuration and a tripod configuration with a receptacle for removable engagement to heavy duty tool attachments.

It is an object of the present invention to provide an embodiment of an apparatus with a stable and strong hand truck configuration, which can transform into a stable and strong tripod configuration.

It is another object of the present invention to provide an embodiment of a hand truck to transform into a stable and strong tripod configuration in order to support heavy duty tools and machinery.

These and other objects and advantages of the present invention will become apparent from a reading of the attached specification and appended claims.

SUMMARY OF THE INVENTION

Embodiments of the present invention include an apparatus transforming back and forth between a hand truck configuration and a tripod configuration. As a hand truck, the apparatus supports and moves heavy equipment from location to location. As a tripod, the apparatus is inverted from the hand truck orientation and functions as a durable stand for supporting tools. For example, a chest of tool attachments, such as vice grips and pipe bending heads, can be moved to a work location with the apparatus in the hand truck configuration. Then, the chest can be unloaded, and the apparatus can be transformed into the tripod configuration. The tool attachments can be anchored into the tripod for use at the work location. The need to transport and store individual tools with their own stands is eliminated. The storage space and ease of transporting multiple tools are improved with the present invention.

The apparatus includes a base frame, a base plate, a plurality of handle rods, and a center rod. The base frame has lateral side supports, a top support member, upper and lower axle support bars, and a middle support member. Each lateral side support has a top end and a bottom end, and the top support member connects across respective top ends. The upper and lower axle support bars attached to respective top and bottom ends of a lateral side support. The middle support bar connects across the upper axle support bars. The plurality of wheel axles connect at the junction of the upper axle support bars and said lower axle support bars to support a wheel on the outside of the base frame. The wheel axles can be connected or separate. Base frame and wheels support the weight of any load on the apparatus in the hand truck configuration while moving.

Embodiments have the base plate with a top planar surface and a bottom planar surface. The lateral side supports are fixed on the top planar surface and are orthogonal to the top planar surface. The bottom planar surface is aligned with the wheels, so that the bottom planar surface actually faces the ground in the hand truck configuration and faces upward as a work surface in the tripod configuration. The wheels are aligned so that the wheels contact the ground when rolling and the wheels are suspended off the ground when the apparatus sits on the bottom planar surface on the ground at rest.

The plurality of handle rods pivotally attaches to the base plate at a pivoting end and extends from the top planar surface of the base plate. Each handle rod has the pivoting end on the top planar surface, parallel to the base frame in the hand truck configuration and a gripping end, opposite the pivoting end. The gripping end is the manual grip in the hand truck configuration and the foot of a leg in the tripod configuration. Each handle rod has a cup and socket connector for pivotal attachment to said base plate, which defines the range and direction of pivoting position of each handle rod. Similarly, the center rod pivotally attaches to the base plate at a center pivoting end and has a top end opposite the center pivoting end. In the hand truck configuration, the top end aligns with the gripping ends of the handle rods, and the top end becomes another foot of a leg in the tripod configuration. The handle rods and center rod can be aligned on an edge of the base plate.

Embodiments of the present invention include a tool attachment comprised of a tool body and an insert shaft. The middle support member can have a receptacle means for removable engagement of the tool attachment to the apparatus in the tripod configuration. The receptacle means has a female connector to engage the insert shaft of the tool attachment, and the receptacle means is accessible at the top surface of the base plate only in the tripod configuration. In some embodiments, the receptacle means is a tubular shaft with openings on both sides. The active use of the tool body is in the tripod configuration and engagement of the insert shaft from the top of the receptacle means. The storage and transport use of the tool body is the engagement of the insert shaft from a bottom of the receptacle means, so that the tool attachment can be transported even in the hand truck configuration.

Embodiments of the present invention include the method for transforming an apparatus between a hand truck configuration and a tripod configuration. First, the apparatus comprised of a base frame, base plate, a plurality of handle rods and a center rod is assembled. The hand truck configuration is set with the handle rods and the center rod attached to the top support member of the base frame. At rest, the bottom planar surface of the base plate faces the ground. When moving, the apparatus pivots on the wheels, and the wheels contact the ground. Then, to transform, the handle rods and the center rod are released from the top support member and pivoted on the top planar surface of the base plate. The apparatus is then inverted with the bottom planar surface of the base plate now facing upward as a working surface. The method further includes mounting the tool attachment onto the apparatus in the tripod configuration and reversing the steps to transform back into the hand truck configuration.

DETAILED DESCRIPTION OF THE DRAWINGS

Figure 1:
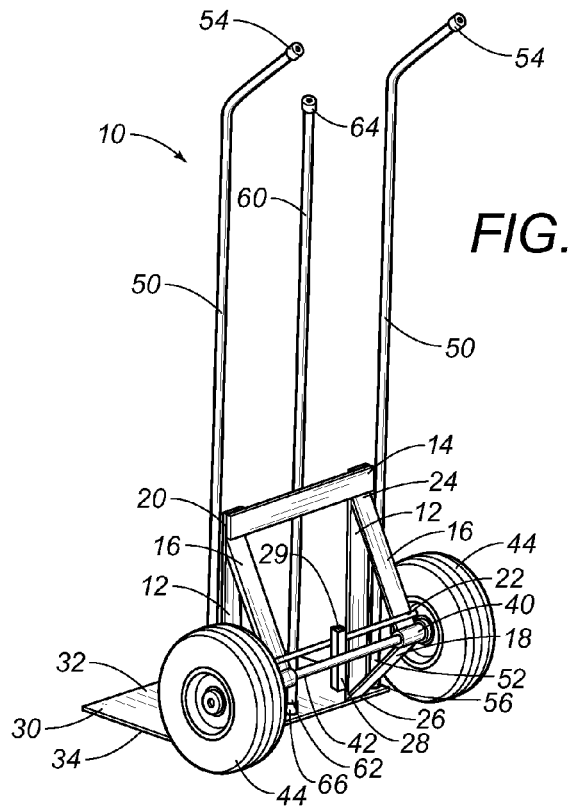
FIG. 1 is a perspective view of an embodiment of the apparatus of the present invention in the hand truck configuration.
Figure 2:
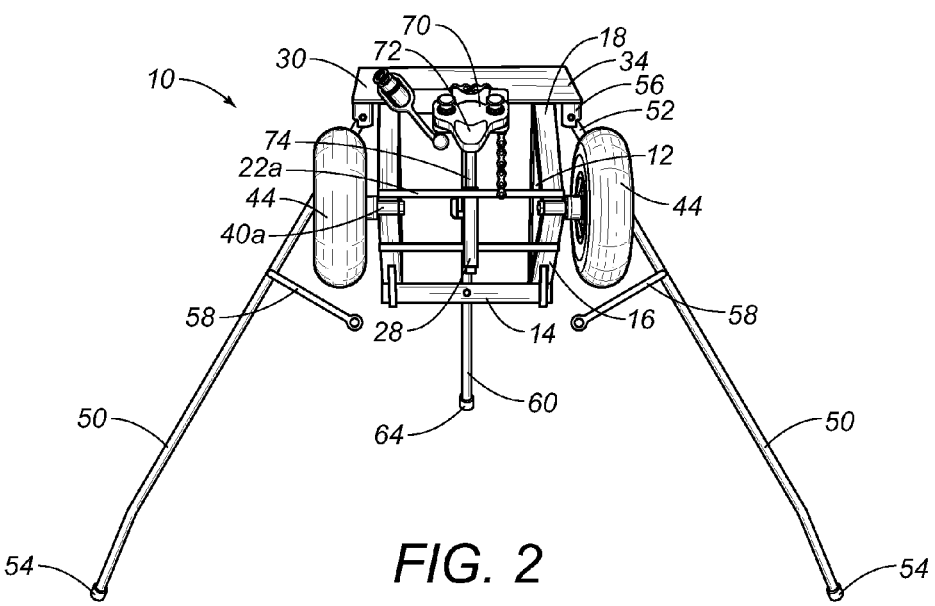
FIG. 2 is a perspective view of an embodiment of the apparatus of the present invention in the tripod configuration.

Referring to FIGS. 1 and 2, the apparatus 10 of the present invention transforms back and forth between a hand truck configuration of FIG. 1 and a tripod configuration of FIG. 2. As a hand truck in FIG. 1, the apparatus 10 can carry and move loads from location to location. The apparatus 10 bears the weight of heaving equipment as a transport device or cart. As a tripod in FIG. 2, the apparatus 10 is inverted from the hand truck orientation and functions as a stand. Tools can be mounted on the apparatus for a work surface and stable support. Heavy tools, which usually require their own stands, can now be transported as attachments to removeably engage the apparatus 10. A set of tools with stands is no longer required to be transported to a work site, since the apparatus 10 of the present invention incorporates a universal stand for various tool attachments. The strength, material composition, and durability of the apparatus 10 can be adjusted for a range of particular tools.

In one example, a chest of tool attachments, such as vice grips and pipe bending heads, can be moved to a work location with the apparatus 10 in the hand truck configuration of FIG. 1. Then, the tool attachments can be unloaded from the chest, and the apparatus 10 can be transformed into the tripod configuration of FIG. 2. The tool attachments can be anchored into the tripod for use at the work location. The number, variety, and efficiency of tool transport are improved by the present invention. The storage on a service vehicle is also improved, such that work trucks no longer require save space for multiple stands and a dolly. Only the present invention and an efficient storage of tool attachment are needed to provide a full complement of heavy duty tools at a work location.

FIGS. 1 and 2 show embodiments of the apparatus 10 comprising a base frame 20, a base plate 30, a plurality of wheel axles 40, a plurality of handle rods 50, and a center rod 60. FIG. 1 shows the hand truck configuration. FIG. 2 shows the tripod configuration.

The base frame 20 includes lateral side supports 12, a top support member 14, upper axle support bars 16, lower axle support bars 18, and a middle support member 22. Each lateral side support 12 has a top end 24 and a bottom end 26. The top support member 14 connects across respective top ends 24 of the lateral side supports 12. Each upper axle support bar 16 attaches to a respective top end 24 of a lateral side support 12 and a respective lower axle support bar 18. Each lower axle support bar 18 attaches to a respective bottom end 26 of a lateral side support 12 and a respective upper axle support bar 16.

Embodiments of the base frame 20 show the lateral side supports 12 as parallel, and the top support member 14 orthogonal to the lateral side supports 12. The shape is generally rectangular with strong right angle connections. The upper and lower axle support bars 16, 18 form acute angles with respective lateral side supports 12, which moves the wheel axles 40 off the generally rectangular plane of the lateral side supports 12 and the top support member 14. The wheels suspended on the wheel axles will run outside the base frame 20, so that the base frame 20 does not hinder any rotation of the wheels. The sets of upper and lower axle support bars 16, 18 are also parallel to each other, as aligned with the respective lateral side supports 12.

The middle support member 22 connects across said upper axle support bars 16. FIG. 1 shows a single rail in the hand truck. FIG. 2 shows an alternative embodiment of the middle support member 22a comprised of two rails, with one rail on the lower axle support bar 18 and the second rail on the upper axle support bar 16. The middle support member 22 in FIGS. 1 and 22a in FIG. 2 are parallel to the top support member 14. The middle support member 22 is closer to the lower axle support bars 18 than the lateral side supports 12 along lengths of the upper axle support bars 16 in FIG. 1. The embodiment of FIG. 2 shows the first rail in this position relative on the lower axle supports 18, and the second rail is positioned on the upper axle supports 16.

Both embodiments of middle support member 22, 22a in FIGS. 1 and 2 have a receptacle means 28. FIG. 1 has the receptacle means 28 on the middle support member 22 on the upper axle support bar 16. FIG. 2 has the receptacle means 28 on the middle support member 22a on both the lower axle support bars 18 and upper axle support bars 16. In both embodiments, the receptacle means 28 is mounted between sets of upper axle support bars 16 and lower axle support bars 18. In some embodiments, the receptacle means 28 is comprised of a tubular shaft, including a square tubular shaft with a square cross-section. The receptacle means 28 is orthogonal to the middle support member 22, 22a and can be parallel and aligned to the lateral side supports 12. Access to openings 29 of the receptacle means 28 can be other either end. Either opening is aligned with the lateral side supports 12. In the hand truck configuration of FIG. 1, opening 29 faces upward for tool attachments to be transported. In the tripod configuration of FIG. 2, opening 29a faces toward the bottom of the apparatus 10, this is the "top" in this inverted state.

FIGS. 1 and 2 also show different embodiments of the plurality of wheel axles 40, 40a connecting the upper axle support bars 16 and the lower axle support bars 18. Each wheel axle 42 supports a wheel 44 outward from a center of the base frame 20. FIG. 1 shows the wheel axles 40 connect by a bar. FIG. 2 shows the wheel axles 40a as separate. The middle support member 22a connects the upper and lower axle support bars 16, 18 in FIG. 2. In both embodiments, the wheels 44 are mounted on both sides of the base frame 20, and the middle support member 22, 22a also remain positioned between the wheels 44.

Embodiments of the present invention further include the base plate 30 having a top planar surface 32 and a bottom planar surface 34. The lateral side supports 12 are fixed on the top planar surface 12. The lateral side supports 12 are orthogonal to the top bottom planar surface 12 and can be made integral through welding or other attachment. FIG. 1 shows the top planar surface 32 facing upward for contacting the load carried on the apparatus 10. FIG. 2 shows the top planar surface 32 facing downward and the bottom planar surface 34 facing upward as the working surface of the tripod configuration. The bottom planar surface 34 remains aligned with the wheels 44 so that the wheels 44 do not interfere with the working surface of the bottom planar surface 34. In the hand truck configuration of FIG. 1, the wheels and the bottom planar surface 34 touch the ground at rest. The wheels and base plate 30 are co-planar in the hand truck configuration and touch ground at the same time. In motion, the load is pivoted onto the wheels.

Figure 3:
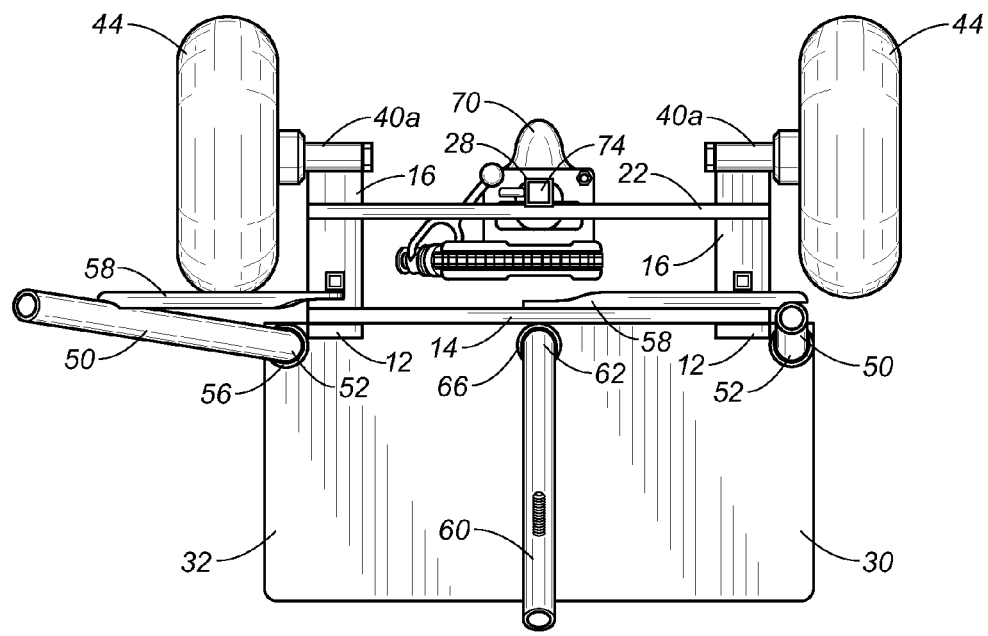
FIG. 3 is a top plan view of the embodiment of the apparatus of the present invention in the transition from hand truck configuration to tripod configuration.
Figure 4:
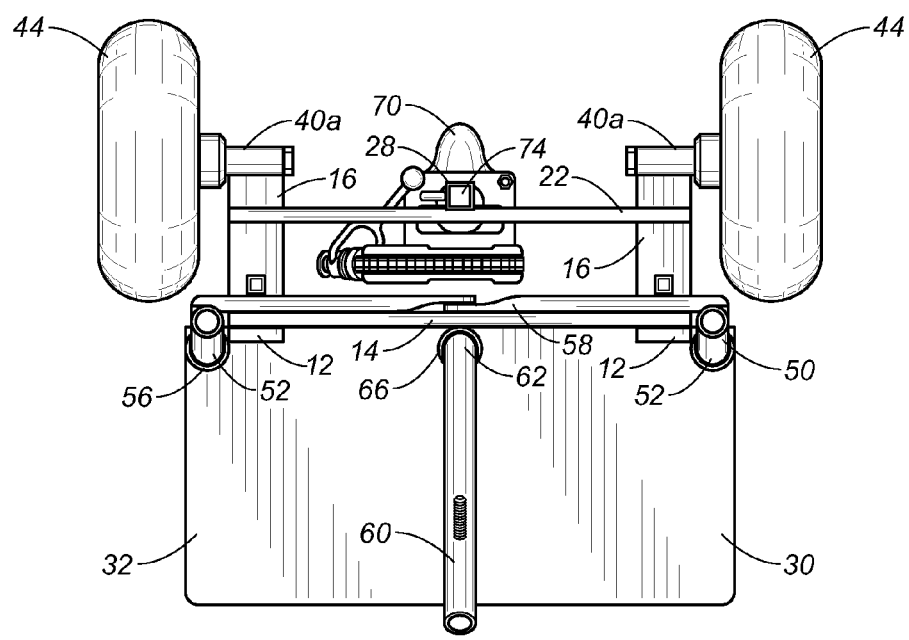
FIG. 4 is another top plan view of an embodiment of the apparatus of the present invention in the hand truck configuration.
Figure 5:
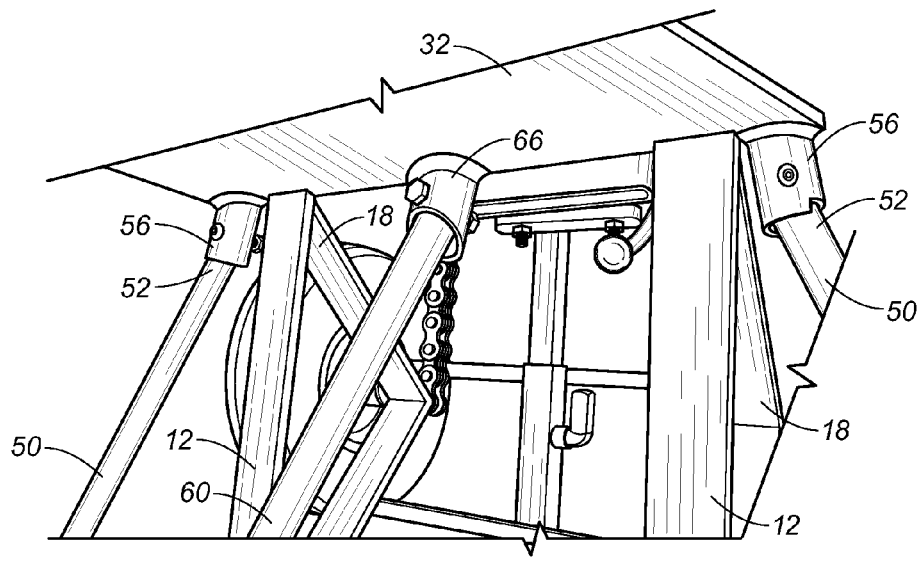
FIG. 5 is an isolated close up perspective view of an embodiment of the apparatus of the present invention, showing the connectors of the center rod and handle rods.
Figure 6:
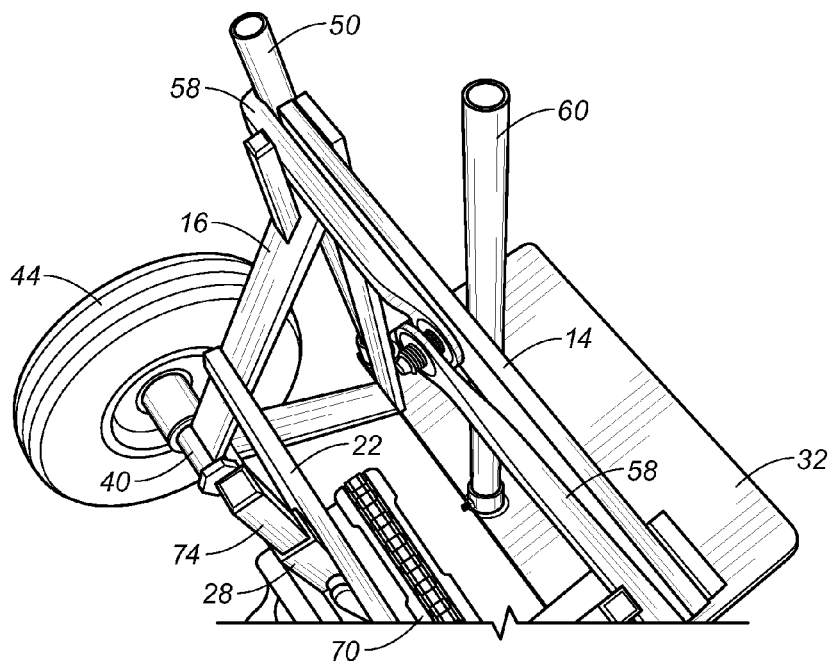
FIG. 6 is another isolated close up perspective view of an embodiment of the apparatus of the present invention, showing the attachment of the cross ribs and center rod to the top support member in the hand truck configuration.

FIGS. 1-2 and 3-6 show embodiments of the plurality of handle rods 50 in the different configuration. FIGS. 1, 4 and 6 show the hand truck configuration. FIGS. 2 and 3 show the tripod configuration. FIG. 5 shows a transition with the handle rods 50 moving between configurations. Each handle rod 50 is pivotally attached to the base plate at a pivoting end 52 and extending from the top planar surface 32 of the base plate. Each handle rod 50 has a gripping end 54 opposite the pivoting end 52 so as to form a manual grip in the hand truck configuration of FIGS. 1, 4 and 6 and a foot of a leg in the tripod configuration of FIGS. 2 and 3.

FIGS. 3-5 show each handle rod 50 having a cup and socket connector 56 for pivotal attachment to the base plate 30. Each connector 56 defines range and direction of pivoting position of each handle rod 50. Each cup and socket connector 56 has a cup portion abutting each handle rod 50 in a first fixed position for the hand truck configuration, and each cup and socket connector 56 has another surface on the cup portion abutting each handle rod 50 in a second fixed position for the tripod configuration. The connectors 56 are durable, strong, and friction fit. The mechanical strength of the cup portion holds the pivot hold to withstand the stresses and pressure of heavy duty tools in the tripod configuration and bearing heavy loads in the hand truck configuration.

Embodiments of FIGS. 2-4 and 6 show each handle rod 50 being comprised of a cross rib 58. The cross rib 58 extends orthogonal to each handle rod 50 and aligns with the top support member 14. Each cross rib 58 can be affixed to the top support member 14 in the hand truck configuration. FIGS. 2-4 and 6 show the cross rib 58 pointing inward toward the base frame 20 in the tripod configuration.

FIGS. 5-6 show embodiments of the center rod 60 being pivotally attached to the base plate 30 at a center pivoting end 62 and extending from the top planar surface 32 of the base plate 20. The center rod 60 can be centered between the plurality of handle rods 50 along an edge of the base plate 30. More than one center rod 60 can also be an embodiment. Similar to the handle rods 50, the center rod can have a top end 64 opposite the center pivoting end 62 and aligned with the gripping ends 54 of the handle rods 50 in the hand truck configuration. See FIG. 1. The top end 64 is another leg stand in the tripod configuration of FIG. 2. FIG. 5 shows a close-up view of the center rod 60 having a center cup and socket connector 66 for pivotal attachment to the base plate 30. The center connector 66 defines range and direction of pivoting position of center rod 60. FIG. 5 shows how a cup portion has limited surfaces to abut the center rod 60 against the connector 66. The center connector 66 abuts the center rod 60 in a first fixed position for the hand truck configuration and in a second fixed position for the tripod configuration. FIG. 6 shows the center rod affixed to the top support member 14 in the hand truck configuration. The center rod 60 is aligned with at least one cross rib 58 of the handle rods 50, as shown in FIG. 6.

Embodiments of the present invention further include a tool attachment 70 comprised of a tool body 72 and an insert shaft 74. The insert shaft 74 is removeably attached to the receptacle means 28. FIG. 2 shows the tripod configuration with the tool body 72 extended above the bottom planar surface 34 of the base plate 30. The bottom planar surface 34 becomes the work surface and access to the active part of the tool body 72 is available. The sliding engagement of the insert shaft 74 in the receptacle means 28 adjusts height and position. The insert shaft 74 has a cross-sectional shape cooperative with a shape of the receptacle means 28. For example, if the receptacle means 28 is a square tubular member, then the insert shaft 74 is a complementary square tubular member to fit inside the receptacle means 28. The tool body 72 can be selected from at least one of a group consisting of a table saw surface, a vice, and a pipe bending head. There are various positions for the tool attachment 70. FIG. 1 shows that the tool attachment 70 can be transported separately, like in a chest with various other attachments. FIGS. 3, 4 and 6 show the tool attachment 70 in the receptacle means 28 retracted in the receptacle means 28 so that the apparatus 10 can roll without the tool body 72 contacting the floor. The tool attachment 70 is being transported in this configuration. It may also be possible to transport the tool attachment 70 in FIG. 1, with the tool attachment 70 extending upward from the receptacle means 28. FIG. 2 shows the active position, with the tool attachment 70 extended from the receptacle means 28 and above the bottom planar surface 34 of the base plate 20.

The method for transforming an apparatus between a hand truck configuration and a tripod configuration is also an embodiment of the present invention. In the method, the apparatus, being comprised of a base frame, base plate, a plurality of handle rods and a center rod, is assembled. Then, the hand truck configuration is set with the handle rods 50 and the center rod 60 attached to the top support member 14 of the base frame 20. The handle rods 50 and the center rod 60 are orthogonal to the base plate 30, with the wheels 44 and the bottom planar surface being oriented on a ground surface. The gripping ends 54 of handle rods 50 point upward for manual control of the apparatus as a hand truck. The apparatus can be pivoted onto the wheels 44 for transporting a load on the base plate 30 and base frame 20. Then, the handle rods and the center rod are released from the top support member 14. FIGS. 4 and 6 show a screw threaded engagement of the cross ribs 58, the center rod 60 and the top support member 14. The threaded engagement can be released.

The rods 50, 60 are then pivoted on the base plate with a range of motion set by respective cup and socket connectors 56, 66. At full pivot by the connectors 56, 66, the apparatus is inverted with the gripping ends of the handle rods on a ground surface and the top end of the center rod on the ground surface. The cup and socket connectors 56, 66 resiliently hold position of the handle rods 50 and the center rod 60 relative to the base plate 30, and the opening 29, 29a of the receptacle means 28 is exposed. Thus, the tripod configuration is set with the handle rods 50 and the center rod 60 pivoted at locked angles to the base plate 30.

In some embodiments, the method further includes inserting a tool attachment into the receptacle 28. The tool attachment can extend from the receptacle means 28 above the bottom planar surface of the base plate in the tripod configuration. The tool attachment 70 can also be retracted into the receptacle means 28 for transporting without scratching the ground in the hand truck configuration. Alternatively, the tool attachment 70 can be inserted into an opening at an opposite end of the receptacle means 28 in the hand truck configuration for transport. Embodiments also include reversing the steps of inverting the apparatus and releasing the handle rods and the center rod, which re-sets the hand truck configuration. The method converts the apparatus 10 between both configurations.

The present invention converts back and forth between a hand truck configuration and a tripod configuration. The present invention has the additional functionality of a single apparatus to transport and support heavy duty tools. The apparatus transforms without additional parts. The tripod configuration is compatible with various heavy duty tools, so that a separate tool and stand is no longer required to be transports on a service vehicle to a work site. There is a universal attachment at the receptacle for different tool bodies to be compatible with the apparatus. Thus, the more efficient apparatus can be used to save storage space on the service vehicle and at the work site. The configuration is dependent upon the transformation and orientation. The inversion separates hand truck functions from tripod functions. The durability and strength of the inverted hand truck allows the tripod to be compatible with more heavy duty tools and equipment.

The foregoing disclosure and description of the invention is illustrative and explanatory thereof. Various changes in the details of the described method can be made without departing from the true spirit of the invention.

I claim:

1. An apparatus having a hand truck configuration and a tripod configuration, said apparatus comprising:
    a base frame comprising:
        lateral side supports, each lateral side support having a top end and a bottom end;
        a top support member connecting across respective top ends of said lateral side supports;
        upper axle support bars, each upper axle support bar attaching to a respective top end of a lateral side support;

lower axle support bars, each lower axle support bar attaching to a respective bottom end of a lateral side support and a respective upper axle support bar; and
a middle support member connecting across said upper axle support bars;
a plurality of wheel axles connecting said upper axle support bars and said lower axle support bars, each wheel axle supporting a wheel outward of said base frame;
a base plate having a top planar surface and a bottom planar surface, wherein said lateral side supports are fixed on said top planar surface, said lateral side supports being orthogonal to said top planar surface, said base plate being made integral with said lateral side supports;
a plurality of handle rods, each handle rod being pivotally attached to said base plate at a pivoting end and extending from said top planar surface of said base plate, each handle rod having a gripping end opposite said pivoting end so as to form a manual grip in said hand truck configuration and a foot of a leg in said tripod configuration; and
a center rod being pivotally attached to said base plate at a center pivoting end, extending from said top planar surface of said base plate, and having a top end opposite said center pivoting end and aligned with said gripping ends of said handle rods in said hand truck configuration, said top end being another leg in said tripod configuration.

2. The apparatus having a hand truck configuration and a tripod configuration, according to claim 1, said lateral side supports being parallel, said top support member being orthogonal to lateral side supports, wherein the upper and lower axle support bars form acute angles with said lateral side supports.

3. The apparatus having a hand truck configuration and a tripod configuration, according to claim 1, wherein sets of upper and lower axle support bars are parallel to each other, and wherein said middle support member is parallel to said top support member, said middle support member being closer to said lower axle support bars than said lateral side supports along lengths of said upper axle support bars.

4. The apparatus having a hand truck configuration and a tripod configuration, according to claim 1, said middle support member being comprised of a receptacle means mounted between sets of upper axle support bars and lower axle support bars.

5. The apparatus having a hand truck configuration and a tripod configuration, according to claim 4, said receptacle means being orthogonal to said middle support member and parallel to said lateral side supports.

6. The apparatus having a hand truck configuration and a tripod configuration, according to claim 4, wherein access to an opening of said receptacle means is aligned with said lateral side supports.

7. The apparatus having a hand truck configuration and a tripod configuration, according to claim 1, said plurality of wheel axles being comprised of two wheel axles, wherein wheels are mounted on both sides of said base frame.

8. The apparatus having a hand truck configuration and a tripod configuration, according to claim 7, wherein said two wheel axles are connected across said base frame.

9. The apparatus having a hand truck configuration and a tripod configuration, according to claim 1, wherein each handle rod comprises a cup and socket connector for pivotal attachment to said base plate, each connector defining range and direction of pivoting position of each handle rod.

10. The apparatus having a hand truck configuration and a tripod configuration, according to claim 9, each cup and socket connector abutting each handle rod in a first fixed position for said hand truck configuration, each cup and socket connector abutting each handle rod in a second fixed position for said tripod configuration.

11. The apparatus having a hand truck configuration and a tripod configuration, according to claim 1, each handle rod being comprised of a cross rib, said cross rib extending orthogonal to each handle rod and being aligned with said top support member, each cross rib being affixed to said top support member in said hand truck configuration, and each cross rib pointing inward toward said base frame in said tripod configuration.

12. The apparatus having a hand truck configuration and a tripod configuration, according to claim 1, wherein said center rod is comprised of a center cup and socket connector for pivotal attachment to said base plate, the center connector defining range and direction of pivoting position of center rod.

13. The apparatus having a hand truck configuration and a tripod configuration, according to claim 12, the center connector abutting said center rod in a first fixed position for said hand truck configuration, the center connector abutting said center rod in a second fixed position for said tripod configuration, said center rod being affixed to said top support member in said hand truck configuration, and said center rod being aligned with at least one cross rib of the handle rods.

14. The apparatus having a hand truck configuration and a tripod configuration, according to claim 1, further comprising:
a tool attachment comprised of a tool body and an insert shaft, said insert shaft being removeably attached to said receptacle means in said tripod configuration.

15. The apparatus having a hand truck configuration and a tripod configuration, according to claim 14, said tool body being selected from one of a group consisting of a table saw surface, a vice, and a pipe bending head.

16. The apparatus having a hand truck configuration and a tripod configuration, according to claim 14, said insert shaft having a cross-sectional shape cooperative with a shape of said receptacle means.

17. A method for transforming an apparatus between a hand truck configuration and a tripod configuration, said method comprising the steps of:
assembling the apparatus of claim 1;
setting said hand truck configuration with said handle rods and said center rod attached to said top support member of said base frame, said handle rods and said center rod being orthogonal to said base plate, said wheels and said bottom planar surface being oriented on a ground surface;
releasing said handle rods and said center rod from said top support member;
pivoting said handle rods and said center rod on said base plate, wherein range of motion of said handle rods and said center rod is set by respective cup and socket connectors;
inverting said apparatus with said gripping ends of said handle rods on a ground surface and said top end of said center rod on said ground surface, said cup and socket connectors resiliently holding position of said handle rods and said center rod relative to said base plate;
exposing an opening of a receptacle means aligned with said bottom planar surface of said base plate; and
setting said tripod configuration with said handle rods and said center rod pivoted at angles to said base plate.

18. The method for transforming an apparatus between a hand truck configuration and a tripod configuration, according to claim 17, further comprising the steps of:
- inserting a tool attachment into said receptacle means in said tripod configuration, said tool attachment being planar with said bottom planar surface of said base plate, said bottom planar surface facing upward and opposite said ground surface.

19. The method for transforming an apparatus between a hand truck configuration and a tripod configuration, according to claim 17, further comprising the steps of:
- inserting a tool attachment into said receptacle means in said hand truck configuration, said tool attachment facing upward from said bottom planar surface of said base plate.

20. The method for transforming an apparatus between a hand truck configuration and a tripod configuration, according to claim 17, further comprising the steps of:
- reversing the steps of inverting said apparatus and releasing said handle rods and said center rod; and
- re-setting said hand truck configuration.

\* \* \* \* \*